United States Patent
Chaiko (10) Patent No.: US 7,157,516 B2
(45) Date of Patent: Jan. 2, 2007

(54) POLYOLEFIN NANOCOMPOSITES

(75) Inventor: David J. Chaiko, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 198 days.

(21) Appl. No.: 10/874,774

(22) Filed: Jun. 23, 2004

(65) Prior Publication Data

US 2004/0260000 A1   Dec. 23, 2004

Related U.S. Application Data

(60) Provisional application No. 60/480,731, filed on Jun. 23, 2003.

(51) Int. Cl.
   *C08K 3/34*   (2006.01)

(52) U.S. Cl. ............... 524/445; 524/186; 524/275; 524/277; 524/447; 501/145

(58) Field of Classification Search ............... 524/445, 524/447, 277, 275, 186; 501/145
   See application file for complete search history.

(56) References Cited

U.S. PATENT DOCUMENTS

| | | |
|---|---|---|
| 3,977,594 A | 8/1976 | Swan |
| 4,412,018 A | 10/1983 | Finlayson et al. |
| 4,434,075 A | 2/1984 | Mardis et al. |
| 4,435,217 A | 3/1984 | House |
| 4,517,112 A | 5/1985 | Mardis et al. |
| 4,810,734 A | 3/1989 | Kawasumi et al. |
| 4,816,517 A | 3/1989 | Wilkus et al. |
| 5,552,469 A | 9/1996 | Beall et al. |
| 5,554,670 A | 9/1996 | Giannelis et al. |
| 5,582,638 A | 12/1996 | Coutelle et al. |
| 5,645,758 A | 7/1997 | Kawasumi et al. |
| 5,698,624 A | 12/1997 | Beall et al. |
| 5,726,247 A | 3/1998 | Michalczyk et al. |
| 5,747,560 A | 5/1998 | Christiani et al. |
| 5,840,796 A | 11/1998 | Badesha et al. |
| 5,876,812 A | 3/1999 | Frisk et al. |
| 5,910,523 A | 6/1999 | Hudson |
| 5,962,553 A | 10/1999 | Ellsworth |
| 6,034,163 A | 3/2000 | Barbee et al. |
| 6,036,765 A | 3/2000 | Farrow et al. |
| 6,043,300 A | 3/2000 | Santhanam |
| 6,060,549 A | 5/2000 | Li et al. |
| 6,103,817 A | 8/2000 | Usuki et al. |
| 6,136,908 A | 10/2000 | Liao et al. |
| 6,156,835 A | 12/2000 | Anderson et al. |
| 6,172,121 B1 | 1/2001 | Chaiko |
| 6,225,374 B1 | 5/2001 | Vaia et al. |
| 6,262,162 B1 | 7/2001 | Lan et al. |
| 6,271,297 B1 | 8/2001 | Ishida |
| 6,271,298 B1 | 8/2001 | Powell |
| 6,380,295 B1 | 4/2002 | Ross et al. |
| 6,407,155 B1 | 6/2002 | Qian et al. |
| 6,632,868 B1 | 10/2003 | Qian et al. |
| 6,759,463 B1 | 7/2004 | Lorah et al. |
| 6,790,896 B1 * | 9/2004 | Chaiko ............... 524/445 |
| 6,822,035 B1 | 11/2004 | Chaiko |
| 6,841,226 B1 | 1/2005 | Dontula et al. |
| 6,864,308 B1 | 3/2005 | Rosenthal et al. |

OTHER PUBLICATIONS

Jordan, John W., "Organophilic Bentonites," *J. Phys. Colloid Chem.*, vol. 53, pp. 294-306, 1949, published by Baltimore, Williams & Wilkins Co. Feb. 1949.

Kawasumi, M., et al., "Liquid Crystalline Composite Based on a Clay Mineral," *Mol. Cryst. Liq. Cryst.*, vol. 281, pp. 91-103, 1996, published by Gordon and Breach Science Publishers SA, printed in Malaysia. Apr. 11, 1997.

Kawasumi, M., et al., "Preparation and Mechanical Properties of Polypropylene—Clay Hybrids," *Macromolecules*, vol. 30, pp. 6333-6338, 1997, published by American Chemical Society. Oct. 6, 1997.

Hasegawa, N., et al., "Preparation and Mechanical Properties of Polypropylene-Clay Hybrids Using a Maleic Anhydride-Modified Polypropylene Oligomer," *J. Appl. Poly. Sci.*, vol. 67, pp. 87-92, 1998, published by John Wiley & Sons, Inc. Jan. 3, 1998.

* cited by examiner

*Primary Examiner*—Kriellion Sanders
(74) *Attorney, Agent, or Firm*—Foley & Lardner LLP (57) ABSTRACT

The present invention relates to methods for the preparation of clay/polymer nanocomposites. The methods include combining an organophilic clay and a polymer to form a nanocomposite, wherein the organophilic clay and the polymer each have a peak recrystallization temperature, and wherein the organophilic clay peak recrystallization temperature sufficiently matches the polymer peak recrystallization temperature such that the nanocomposite formed has less permeability to a gas than the polymer. Such nanocomposites exhibit 2, 5, 10, or even 100 fold or greater reductions in permeability to, e.g., oxygen, carbon dioxide, or both compared to the polymer. The invention also provides a method of preparing a nanocomposite that includes combining an amorphous organophilic clay and an amorphous polymer, each having a glass transition temperature, wherein the organophilic clay glass transition temperature sufficiently matches the polymer glass transition temperature such that the nanocomposite formed has less permeability to a gas than the polymer.

26 Claims, 5 Drawing Sheets

POLYOLEFIN NANOCOMPOSITES

CROSS-REFERENCES TO RELATED APPLICATIONS

The present application claims priority to U.S. Provisional Application No. 60/480,731, filed Jun. 23, 2003, the entire contents of which are incorporated by reference herein.

STATEMENT REGARDING FEDERALLY SPONSORED RESEARCH

The United States Government has rights in this invention pursuant to Contract No. W-31-109-ENG-38 between the United States Department of Energy and the University of Chicago representing Argonne National Laboratory.

FIELD OF THE INVENTION

This invention relates to a method for preparing organoclays for use in clay/polymer nanocomposites. More particularly, the invention relates to methods for the surface modification of clays to provide solid-state compatibility between the organoclay and semi-crystalline polymers like the polyolefins and waxes.

BACKGROUND OF THE INVENTION

Since the late 1980s a great deal of research around the world has focused on developing methods to incorporate fully exfoliated smectite clays into polymers to increase mechanical and barrier properties. The typical approach relies on organoclay technology developed by Jordan in the 1950s, wherein the clay surface is treated to render it compatible with hydrophobic materials like the polyolefins and waxes. This surface treatment consists of an adsorbed monolayer of a high-molecular-weight quaternary amine, such as dimethyl dihydrogenated tallow amine. The surfactant adsorption takes place via an ion-exchange reaction involving the negatively charged basal surface of the clay platelets.

The simple mechanism by which the organoclays can improve barrier properties relies on the high aspect ratio of the exfoliated clay platelets to impart a tortuous path that retards the transport of diffusing species like oxygen or water vapor. In a strictly tortuous path mechanism, all diffusing species would be retarded to the same degree. The tortuousity factor can be as high as several-hundred-fold for impermeable platelets with aspect ratios of 100–500 and at modest mineral loadings of 5–10 volume percent. Unfortunately, nanocomposite performance has not always lived up to expectations, and barrier improvements of two- to four-fold or less are more typical.

To overcome the difficulties in exfoliating organoclays in hydrophobic polymers like the polyolefins, researchers have used functionalized polymers, like maleated polyethylene and polypropylene, as dispersants. While polar functional groups can interact with the organoclay surface and compatibilizing agents can promote exfoliation, this approach to nanocomposite formation has provided only modest improvements in the mechanical properties of polyolefins. Moreover, there have not been any published results that show increased barrier toward oxygen or water vapor in polyolefins or waxes.

Accordingly, there is a need for a rational approach to the design of new organoclay chemistries that provide both melt- and solid-state miscibility and enable the preparation of nanocomposites demonstrating significant improvements in the control of polymer nucleation, crystal growth, and physical properties such as increased mechanical and barrier performance.

SUMMARY OF THE INVENTION

This invention provides a method to prepare clay/polymer nanocomposites with improved control over the dispersion of the organoclay yielding increased barrier properties. Specifically, the method comprises combining an organophilic clay and a polymer to form a nanocomposite, wherein the organophilic clay and the polymer each have a peak recrystallization temperature, and wherein the organophilic clay peak recrystallization temperature sufficiently matches the polymer peak recrystallization temperature such that the nanocomposite formed has less permeability to a gas than the polymer. Such nanocomposites exhibit 2, 5, 10, or even 100 fold or greater reductions in permeability to gasses, e.g., oxygen, carbon dioxide or both, compared to the polymer. Where the peak recrystallization temperatures of the organophilic clay and the polymer are not sufficiently matched, the mixture will show little or no improved barrier properties, and may exhibit partial or substantial phase-separation. Thus, some methods of preparing a nanocomposite include determining whether the peak recrystallization temperature of an organophilic clay sufficiently matches the peak recrystallization temperature of a polymer to form a nanocomposite phase having less permeability to a gas than the polymer, and combining the matched organophilic clay and the polymer to form the nanocomposite having less permeability to a gas than the polymer.

Similarly, the invention provides a method for preparing a nanocomposite comprising combining an amorphous organophilic clay and an amorphous polymer to form a nanocomposite, wherein the clay and the polymer each have a glass transition temperature, and wherein the clay glass transition temperature sufficiently matches the polymer glass transition temperature such that the nanocomposite formed has less permeability to a gas than the polymer.

Invention methods for the preparation of nanocomposites further include the preparation of the organophilic clay by treating a clay with at least one surfactant to yield an organophilic clay having a peak recrystallization temperature higher than the polymer peak recrystallization temperature. Such an organophilic clay may function as a nucleating agent during formation of the nanocomposite. In addition, by use of such an organoclay the growth of polymer spherulites is lessened, reduced in size or prevented.

The nanocomposites formed by the present method include organophilic clays that are partially or completely exfoliated. Such organophilic clays may be prepared by surface treatment of a clay with a surfactant, such as a quaternary amine, and are compatible with hydrophobic materials such as polyolefins and waxes. Additionally, the surface of the clay is modified to produce an isotropic surface coating so that the polymer will wet and bond to the organoclay. This is achievable by using surfactants with sufficiently long alkyl chains so that they can become a part of the polymer crystal phase. Alternatively, if the polymer is amorphous, such as an elastomer, the surfactant used to produce the organoclay will require alkyl chains that also remain amorphous throughout the temperature range of intended use. Typically, the organoclays are surface treated with a high-molecular-weight quaternary amine together with high-molecular-weight hydrotrope and/or an edge modifying surfactant to render the clay surface organophilic.

Suitable clays include phyllosilicates that are able to undergo ion exchange, such as smectites or mica. Natural or synthetic clays may be used in the present invention. Talcs may also be used in the invention but will normally require treatment with an appropriate edge-modifying surfactant. In some embodiments, the methods of the present invention employs a surface-treated clay such as one including a nonionic polymeric hydrotrope adsorbed onto a basal surface thereof, and/or an edge modifying surfactant adsorbed onto an edge thereof.

Various processes may be used to prepare the organoclays. By way of non-limiting example, a smectite clay may be dispersed in water with the use of a pressure vessel to enable heating above the boiling point of the water. The clay slurry is heated to a temperature sufficient to melt the quaternary amine and allow ion exchange with the basal surface of the clay. The product of the reaction being an organoclay that exhibits melt/freeze transitions that match those of the polymer sufficiently so that the clay is able to remain dispersed in both the liquid and solid states. The solids concentration of the slurry may range from less than 1 weight percent to approximately 60 to 70 weight percent. At high solids concentration, sufficient mixing can be accomplished by use of a helical paddle mixer or alternatively, the mixing can be done using a twin-screw or single-screw extruder with a pressurized feeder to eliminate boiling of the water and thereby maintain the clay slurry at the desired water to solids ratio.

DETAILED DESCRIPTION OF THE INVENTION

The present invention provides organoclay/polymer nanocomposites having improved barrier properties and methods for making the same. More specifically, the invention permits the preparation of organoclay/polymer nanocomposites with improved barrier properties, that are explained by simple tortuosity effects, which result from the formation of a nanocomposite phase. The nanocomposite phase may be demonstrated by the presence of a new set of thermal transitions that are intermediate between the individual thermal transitions of the organoclay and the polymer.

The present invention provides for the preparation of polyolefin nanocomposites wherein the organophilic clay is homogeneously dispersed throughout the polymer matrix. Such nanocomposites exhibit superior dispersion stability such that the organoclay is dispersed in the polymer melt and is capable of maintaining the homogenous dispersion as the polymer cools to a semi-crystalline solid. Inventive methods also provide for organoclays that act as nucleating agents by virtue of their high specific surface areas and appropriately designed peak recrystallization temperatures.

Thus, to prepare clay/polymer nanocomposites according to the present invention, the peak recrystallization temperature of the organophilic clay must be sufficiently matched with the polymer peak recrystallization temperature to promote the formation of the nanocomposite phase. The peak melt temperature is that temperature in which the heat absorption by the crystal phase is a maximum rate. The existence of the nanocomposite phase can readily be determined by those of skill in the art using, e.g., DSC showing the absence of the organoclay freeze transition and the appearance of new thermal transitions. The phrase "sufficiently matched" does not require that the peak recrystallization temperatures be identical. Indeed, a wide range of peak recrystallization temperatures is possible. In some embodiments, the organoclay peak recrystallization temperature is within ±100% of the polymer peak recrystallization temperature, and can be within ±50%. In other embodiments the organoclay peak recrystallization temperature is within ±25% of the polymer peak recrystallization temperature, and in still others it is within ±10%. Typically, the barrier properties of a nanocomposite will improve the more closely matched are the peak recrystallization temperatures of the organoclay and polymer.

Other additives such as antioxidants, anticorrosion agents, reactive scavengers, such as colloidal metal oxides for improved acid barrier capabilities, oxygen scavengers for improved oxygen barrier capabilities, UV stabilizers, and colorants such as dyes and pigments may be incorporated into the compositions by admixing with the nanocomposite or by incorporating the additives directly onto the organoclay surface. For example, organoclays may be combined with water-soluble dyes and then dispersed in waxes or polyolefins. In this unique application, the organoclays aid the dispersion of the dyes. Water-soluble dyes which would not be expected to be dispersible in polyolefins may be used.

The present invention also encompasses embodiments wherein the organoclay has been modified on its basal surfaces with nonionic polymeric hydrotropes and on its edges with anionic surfactants that include organophosphorous and organosulfur compounds. The process used to produce hydrotrope-modified organoclays is described in detail in co-pending U.S. patent application Ser. No. 10/078, 992, filed on Feb. 20, 2002, and co-pending U.S. patent application Ser. No. 10/100,381, filed on Mar. 18, 2002. Both applications are herein incorporated by reference in their entirety. Briefly, adsorption of a polymeric hydrotrope on the basal surface of an edge modified clay is achieved by dispersing and/or dissolving a polymeric hydrotrope in the clay dispersion and allowing the hydrotrope to adsorb onto the surface of the dispersed, edge modified clay. The edge modification of the dispersed clay is carried out using an appropriate organic surfactant modifier.

Suitable organic surfactant edge modifiers for use in the present invention include organophosphorous and organosulfur compounds, particularly the following:

a) phosphonic acids with the formula b) phosphonic acids with the formula c) phosphinic acids with the formula d) phosphoric acid esters with the formula e) phosphoric acid diesters with the formula f) phosphorous acid diesters with the formula g) diphosphonic acids with the formula h) pyrophosphoric acid diesters with the formula i) thiophosphonic acids with the formula j) dithiophosphonic acids with the formula where R is an alkyl or hydroxyalkyl group with 1 to 50 carbon atoms or an aryl or hydroxyaryl group with 6 to 12 carbon atoms. Additionally, the R group may include oligomers comprised of two or more chemical species. Nonlimiting examples include polyethylene/poly(ethylene glycol)/polyethylene, polypropylene/poly(ethylene glycol)/polypropylene, polypropylene/poly(ethylene glycol), polyethylene/poly(ethylene glycol), polyethylene/polypropylene, poly(dimethylsiloxane)/poly(alkylmethylsiloxane), polyethylene/polybutylene, polyethylene/polybutene, polypropylene/polybutene, polystyrene/polybutadiene.

Suitable nonionic polymeric hydrotropes include, but are not limited to, polyvinyl alcohol, polyvinylpyrrolidone, polypropylene glycol, polybutylene glycol, methoxypolyethylene glycol, dimethoxypolyethylene glycol, polyethylene glycol, polyethylene glycol derivatives such as, polyethylene glycol acrylate, polyethylene glycol diacrylate, polyethylene glycol methyl ether acrylate, polyethylene glycol methacrylate, polyethylene glycol dimethacrylate, polyethylene glycol methyl ether methacrylate, polyethylene glycol methyl ether epoxide, polyethylene glycol diglycidyl ether, polyethylene glycol phenyl ether acrylate, polyethylene glycol bisphenol A diglycidyl ether, polyethylene glycol dibenzoate, polyethylene glycol bis(3-aminopropyl ether), polyethylene glycol butyl ether, polyethylene glycol dicarboxymethyl ether, polyethylene glycol divinyl ether, as well as copolymers of polyethylene glycol/polypropylene glycol, and polyethylene glycol/polybutylene glycol, polybutene, polybutene-block-polystyrene, polybutene-co-polyethylene, and mixtures thereof.

Other nonlimiting examples of polymeric hydrotropes include polyethylene-block-poly(ethylene glycol)-block-polyethylene, polypropylene-block-poly(ethylene glycol)-block-polypropylene, polypropylene-block-poly(ethylene glycol), polyethylene glycol-block-polypropylene glycol-block-polyethylene glycol, polyethylene glycol-ran-polypropylene glycol, polyethylene glycol-ran-polypropylene glycol monobutyl ether, polypropylene glycol-block-polyethylene glycol-block-polypropylene glycol, polypropylene glycol monobutyl ether, polytetrahydrofuran, polytetrahydrofuran bis(3-aminopropyl), polyethylene-block-polyethylene glycol and polypropylene glycol, and mixtures thereof.

In some embodiments where the surface treated clay has been modified on both basal surfaces and edges, the melt comprises about 1 to about 99 weight percent of the nanocomposite. In other embodiments, the surface treated clay comprises about 1 to about 15 weight percent and typically about 3 to about 10 weight percent of the nanocomposite.

In embodiments wherein the phyllosilicates are subject to cation exchange, the phyllosilicates are exposed to enough cationic surfactant to approximately satisfy the cationic exchange capacity of the phyllosilicates. For dispersions in aliphatic solvents, waxes, and polyolefins, the amount of cation in the dispersion should be enough to satisfy from about 50 to about 100 percent of the cation exchange capacity of the phyllosilicates. This includes embodiments where the amount of cation is sufficient to satisfy from about 75 to about 100 percent of the exchange capacity of the phyllosilicate. The use of these amounts has the advantage that it substantially eliminates excess cationic surfactant which is only loosely bound to the phyllosilicate surface and easily separates during processing and composite material formation, degrading the quality of the composite materials. In preparing organoclays for polyolefin nanocomposites, the cation exchange will be carried out at temperatures at least equal to or above the melting point of the surfactant. For surfactants that melt at temperatures above 100° C. the exchange will be carried out in a reactive extruder that is pressurized to prevent the evaporative loss of water from the clay slurry.

Suitable clays for use in the invention include phyllosilicate clays, such as mica and smectite clays. Exemplary smectite clays include montmorillonite, hectorite, saponite, sauconite, beidellite, nontronite and synthetic smectites such as Laponite®. As will be well understood by one skilled in the art, the clays discussed herein inherently have basal surfaces and are arranged in layers of particles which are stacked on top of one another. The stacking of the clay platelets provides interlayers, or galleries, between the clay layers. These galleries are normally occupied by cations, typically comprising sodium, potassium, calcium, magnesium ions and combinations thereof, that balance the charge deficiency generated by the isomorphous substitution within the clay layers. Typically, water is also present in the galleries and tends to associate with the cations. The distance between the basal surfaces of adjacent clay layers is referred to as the basal spacing.

A wide variety of polymers, including waxes, are suitable for use in nanocomposites produced by inventive methods. Polymers suitable for use include but are not limited to polyethylene (e.g., LDPE, LLDPE, HDPE), poly-α-olefins and poly-α-olefins copolymers with polyethylene, polyesters, polystyrene, poly(methylmethacrylate), poly(methacrylate), poly(ethyl methacrylate), poly(propyl methacrylate), polyisobutylene, poly(styrene-butadiene-styrene), polyurethanes, silicones, polycarbonate, polychloroprene, polyethylene-co-vinyl acetate, atactic polypropylene, syndotactic polypropylene, poly-1-butene, polyisoprene, polybutadiene, polyethylene-co-vinyl alcohol, and polyvinylacetate.

Both natural and synthetic waxes may be used to form nanocomposites according to the present methods. Examples of natural waxes include, but are not limited to, paraffin, microcrystalline montan, vegetable waxes and mixtures thereof. Examples of synthetic waxes include, but are not limited to, Fisher-Tropsch waxes, polyethylene, polypropylene, polymethylene, chemically modified waxes, polymerized alpha-olefins, and mixtures thereof. Chemically modified waxes are well known to those of skill in the art and include hydrocarbon waxes such as microcrystalline and polyethylene waxes that have been oxidized, e.g., by air oxidation or reaction with a polycarboxylic acid, and optionally saponified, esterified or similarly modified. Specific examples of suitable semicrystalline waxes include, but are not limited to polyethylene-block-polyethylene glycol.

To obtain useful nanocomposite properties in clay/polymer mixtures, the organoclay must be compatible with the polymer. Compatibility between polymer/polymer and polymer/wax blends is known from prior art to be a function of the freezing points of the two components. If one component freezes at a significantly higher temperature than the other, the result upon cooling is a phase separated mixture that does not improve the properties of either component. For example, a paraffin wax that freezes at about 45° C. is not compatible with either low density polyethylene which freezes at about 87° C. or with high density polyethylene which freezes above 100° C. The effect of the organoclay on the peak recrystallization temperatures of the polymer must also be considered in the design of a useful nanocomposite system. Melt and shear histories of polymer systems are also important factors. For example, the peak recrystallization temperature of a polymer can be increased 15–20° C. if the temperature of the polymer melt is insufficient to ensure complete crystal melting or if the polymer melt contains locally entangled segments originating from the polymer crystallites.

In a similar manner, amorphous polymers, such as atactic polypropylene, ethylene propylene random copolymers, ethylene vinyl acetate copolymers, polyisoprene, polybutadiene, polychloroprene, polyisobutylene, poly(styrene-butadiene-styrene), silicones, polyurthanes, poly(methyl methacrylate), poly(methacrylate), poly(ethyl methacrylate), poly(propyl methacrylate), poly(butyl methacrylate), atactic polystyrene, would not be compatible with organoclays that possess a surface crystallization temperature. Organoclay compatibility with amorphous polymers would require sufficiently matching the $T_g$ (glass transition temperature) of the surfactant coating with that of the polymer if the nanocomposite is to be used at temperatures below the $T_g$ of the polymer.

In some embodiments, the present methods further include combining a mixture of polar and nonpolar activators with the organophilic clay to disperse the clay in the polymer. Suitable polar activators include alcohols and ketones such as methanol, ethanol, acetone and the like, well known to those of skill in the art. Nonpolar activators that may be used include nonpolar solvents such as styrenes, xylenes or toluenes as well as polymers such as polybutenes, oligomers of polystyrenes, poly alpha olefins, polybutene block copolymers, polyacrylates, polymethacrylates or waxes. For example an organophilic clay that has been surface treated with a quaternary ammonium salt such as CTAB (cetyltrimethylammonium bromide) is normally not dispersible in nonpolar polymers. However, a combination of a non-polar activator such as a polybutene (e.g., polybutene-block-polystyrene) and a polar activator will allow such an organophilic clay to be dispersed in a nonpolar polymer.

The nanocomposites prepared according to the present invention display unexpectedly high gas barrier capabilities in comparison to previous clay/wax and clay/polymer nanocomposites. The nanocomposites disclosed herein can routinely reduce the oxygen permeability of wax coatings by a factor of ten to one hundred or more. The nanocomposites may also provide barriers to nitrogen, carbon dioxide, hydrogen, or water vapor. At sufficient clay concentrations, the permeability may be reduced by one thousand to ten thousand or more. Combinations of wax nanocomposites with polyolefins can in turn result in significant reductions in gas permeability relative to the pure polymer. Reductions in gas permeability (e.g. oxygen, carbon dioxide, or both) of two fold or even ten to one-hundred fold or more relative to the pure polymer can be achieved with the present invention.

While not wishing to be bound by theory and without limiting the scope of the invention, it is believed that invention methods improve the barrier properties of clay/polymer nanocomposites by taking into account the effect of the semi-crystalline structure of polymers on nanocomposite morphology and performance. The polyolefins, consist of a mixture of crystalline and amorphous phases at temperatures above the $T_g$ and below $T_m$ (melting transition temperature) The hydrocarbon chains fold in on themselves to form crystallites which in turn stack upon themselves to form spherulites. The crystallites are generally on the order of 10–20 nm, while the spherulites can be as large as 50–100 microns or larger as in the case of waxes. The crystallites are held together by amorphous polymer segments which contribute to the strength of the material. If the hydrocarbon chain length is shortened sufficiently, as in the case of the waxes, the chains become less and less able to bridge the gap between the crystallites, and the material becomes brittle. Gas diffusion can take place at the interfaces between the crystallites and at the surfaces of the spherulites. Thus, a tortuous diffusion path is an inherent component of all semi-crystalline polymer systems.

Despite the chemical similarity between paraffin wax and low-density polyethylene (LDPE), they are not compatible because of the large difference in their freezing points—that is, their mixtures phase-separate upon cooling from the melt. By extension, organoclay that is prepared with paraffin-like surfactants is unlikely to be compatible with either LDPE or the other polyolefins. During cooling of the polymer, if the interaction energy between the organoclay surface and the polymer chains is insufficient to disrupt the normal crystallization process, the organoclay will be pushed aside by the growing polymer crystallites, along with any other impurities that happen to be present in the polymer melt. In fact, there is no prior art showing an increase in barrier properties for any olefin-based nanocomposites, including waxes. In these systems, the addition of organoclays, according to prior art, actually results in a decrease of barrier properties. The lack of significant commercial nanocomposite barrier materials, despite years of research since the first publications in the field (see, e.g., Okada, F., et al., U.S. Pat. No. 4,739,007 (1988)) illustrates just how difficult these problems are to solve.

Thus, it is not enough that the melted polymer wet the surface of the organoclay; the cohesion energy of the organoclay coating must be close to that of the wax or polyolefin crystal phase. In other words, the freezing points of the surfactant chains on the clay surface and the polyolefin must be close enough to enable the exfoliated organoclay to enter solid solution as the nanocomposite phase freezes. It is reasonable to expect that this requirement will be true of all semi-crystalline materials, such as nylons, polyesters, and polyolefins. Because of supercooling effects, peak recrystallization temperatures will be lower than the melting temperatures. In addition, the presence of the organoclay may affect the peak recrystallization temperature, especially if the organoclay is capable of acting as a nucleating agent. Therefore, the peak recrystallization temperature is expected to be a better predictor of solid-state miscibility than is the melting point.

The following non-limiting examples serve to further illustrate advantages of the disclosed invention.

EXAMPLES

Example 1

This example illustrates the superior barrier performance that can be achieved when the melt/freeze transitions of the organoclay and a paraffin wax are sufficiently matched to generate a new nanocomposite phase. An organophilic clay was prepared from a commercially available, water-washed montmorillonite (Cloisite Na® which is a product of Southern Clay Products). The clay was dispersed in 40° C. tap water at a solids concentration of 2.5 weight percent by high-shear mixing for 40 minutes. The edge of the clay was modified by addition of an aqueous solution of the ammonium salt of 1-hydroxydodecane-1,1-diphosphonic acid. The amount of ammonium alkyldiphosphonate added was 3 weight percent relative to the weight of the dry clay. Following equilibration for 30 minutes, the temperature of the slurry was increased to 70° C. and an amount of dimethyl dihydrogenated tallow ammonium chloride (Arquad 2HT-75, a quaternary amine salt commercially available from Akzo Nobel) equivalent to 110 milliequivalents per 100 g clay was added over a period of one hour. Combined with the quaternary amine was an amount of poly(propylene glycol) equivalent to 4 weight percent relative to the dry weight of the clay. The molecular weight of the poly (propylene glycol) was 1000. Also combined with the quaternary amine solution was an antioxidant, Irganox® B225 (a product of Ciba Specialty Chemicals Corp.) at a concentration of 1000 ppm relative to the weight of the organoclay. Mixing of the clay suspension was continued for one hour after all of the quaternary amine salt was added. The suspension was vacuum filtered, redispersed in deionized water at 60° C. and refiltered. The organoclay was dried under vacuum at 70° C. to produce a fine powder with less than 1 weight percent moisture. The basal spacing of the organoclay product, as measured by x-ray diffraction, was approximately 36.5 Å.

Wax nanocomposites with organoclay concentrations of 5, 10, and 15 weight percent were prepared by mixing the organoclay powder into the melted wax with stirring at approximately 80° C. The paraffin used to prepare the samples was purchased from Aldrich Chemical Co. The wax nanocomposites were applied to a silicone release paper using a smooth coating rod from R. D. Specialties, Inc.

The oxygen transmission rate was measured on films with thickness of approximately 2 mils. The measured film thickness was used to calculate oxygen permeability from the measured oxygen transmission rate. The results for three different organoclay loadings are shown in Table 1 along with the reference value for zero clay addition. (A control experiment in which 5 weight percent Cloisite 15A was dispersed in the wax showed no reduction in oxygen permeability.) There is a dramatic decrease in oxygen permeability with increasing organoclay concentration until 15 weight percent organoclay loading. Microscopic examination of the film with 15 weight percent organoclay revealed extensive cracking that looked identical to that in the reference film with no added organoclay. With only 5 weight percent organoclay the oxygen permeability dropped by approximately 62 fold, while with 10 weight percent organoclay addition, the oxygen permeability dropped by 330 fold. This performance is well beyond what has been found in nylon nanocomposites where reduction in oxygen permeability of 2–5 fold is found for 2–5 weight percent organoclay loading. See, e.g., A. Usuki, N. Hasegawa, H. Kadoura, and T. Okamoto, Nano Lett, 1, No. 5, 271 (2001). No reduction in oxygen permeability has been reported for wax nanocomposites.

TABLE 1

Oxygen Permeability of clay/wax nanocomposite films.

| Organoclay, Wt % | $O_2$ Permeability* |
|---|---|
| 0 | $4629 \times 10^{-17}$ |
| 5 | $75 \times 10^{-17}$ |
| 10 | $14 \times 10^{-17}$ |
| 15 | $4629 \times 10^{-17}$ |

*units are mol $O_2$/m · s · Pa

The levels of reduction in gas permeability found in nylon nanocomposites are consistent with tortuosity mechanism in which the permeability is proportional to clay loading (i.e., Nielsen model). If the gas permeability is limited by diffusion through narrow gaps between the oriented clay platelets, the relative permeability is a function of the aspect ration ($\alpha$) and the clay loading ($\phi$ as shown in equation (1):

$$P_o/P_c = 1 + \tfrac{1}{2}\alpha \cdot \phi \quad (1)$$

where $P_o$ and $P_c$ are the permeability of the pure polymer and the nanocomposite, respectively. In this case the relative permeability is proportional to the clay loading. If the premeability is limited by gas diffusion around impermeable clay platelets, the relative permeability becomes proportional to the square of the clay loading:

$$P_o/P_c = 1 + \alpha^2 \cdot \phi^2/(1-\phi) \quad (2)$$

If we attempt to fit the data of Table 1 with the Nielsen equation (Eq. 1) in which the gas premeability is a function of both the volume fraction of the mineral filler and the aspect ratio of the filler platelets, we can calculate an effective aspect ratio for the organoclay platelets in our wax nanocomposites at 5 and 10 weight percent organoclay. The calculated aspect ratios turn out to be approximately 3,000 and 9,500 for 5 weight percent and 10 weight percent clay loading, respectively. These values are well beyond the typical aspect ratios for montmorillonite which are reported to be between 100–500. If, on the other hand, we use Eq 2 to back calculate an effective aspect ratio, we obtain values of 250 and 240 at 5 and 10 weight percent loading, respectively. These values are well within the physically acceptable range of aspect ratios for montmorillonite in nanocomposite systems. Clearly, the mechanism by which the oxygen permeability in the wax nanocomposites is reduced is by a tortuous path in which the permeability is limited by diffusion around the clay platelets as described in Eq 2.

Figure 1:
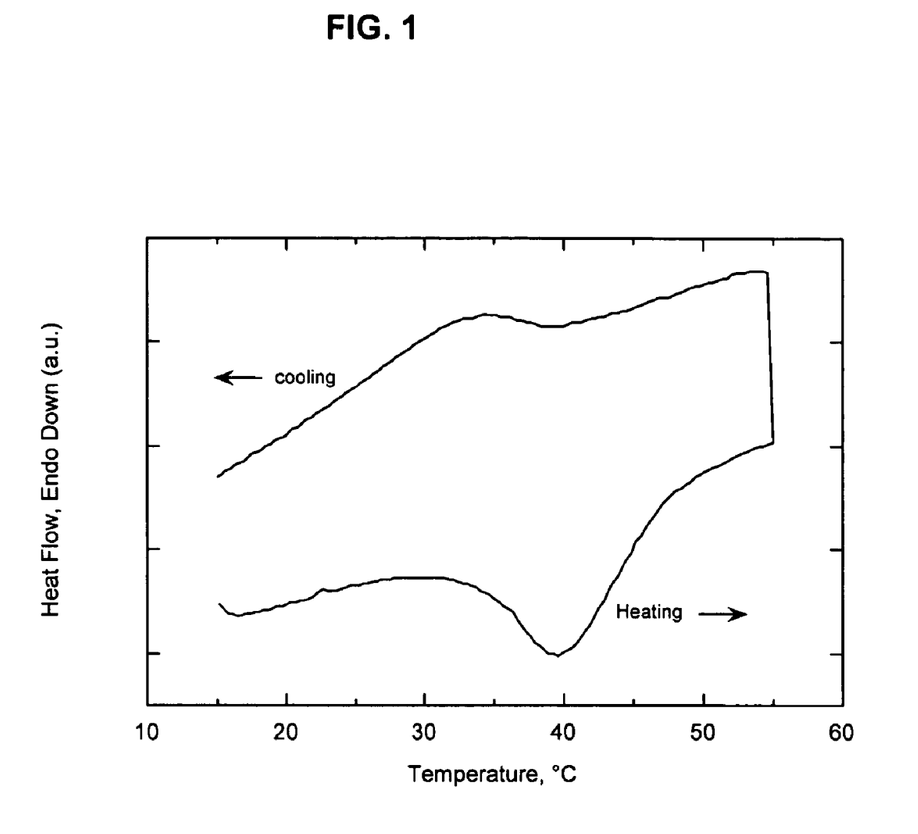
FIG. 1. Differential Scanning Calorimetry (DSC) curve for the organoclay of Example 1. The peak transition from the crystal phase to the lamellar liquid crystal (LLC) phase occurs at about 40° C., while the recrystallization transition occurs at about 34.4° C. with a heat of crystallization of −4.4 J/g.
Figure 2:
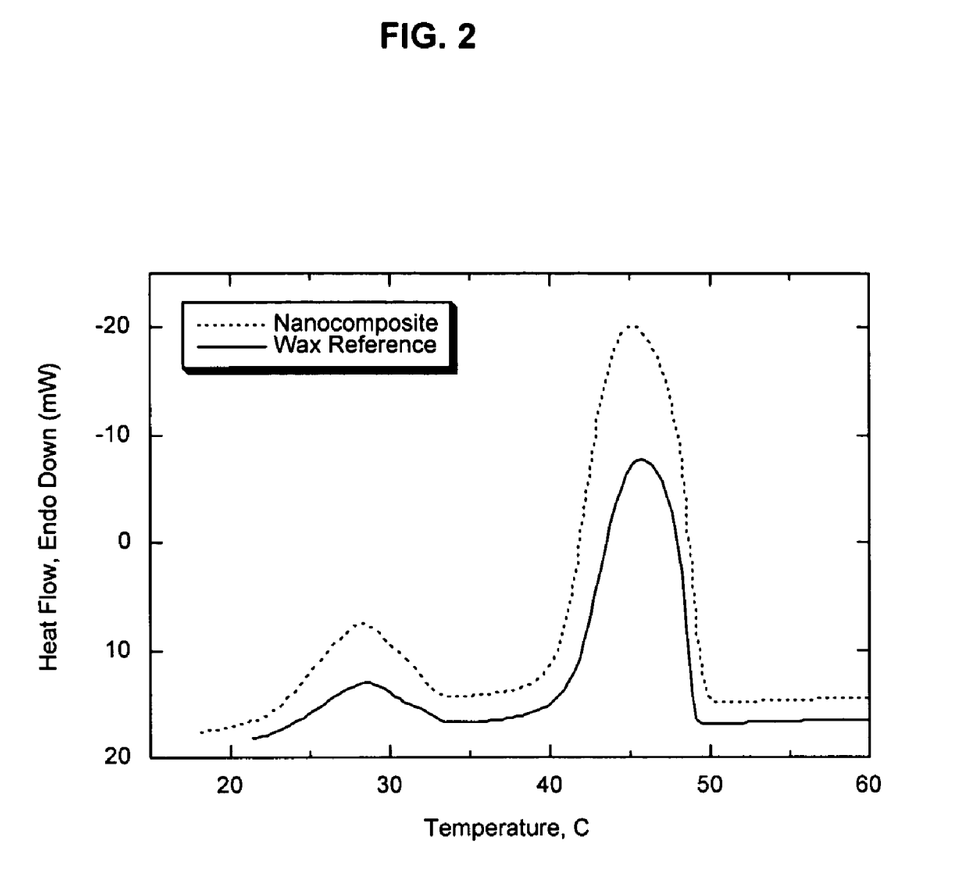
FIG. 2. Cooling curves for a paraffin reference and the nanocomposite of Example 1 containing 10 weight percent organoclay. The peak freeze transitions occur at 45° and 28° C. The peak freeze transition for the pure organoclay is no longer present in the nanocomposite.

In this example, the melt/freeze transitions of the organoclay and the wax are close enough to produce a nanocomposite phase in which the organoclay remains in solid solution after the freezing of the wax takes place. The DSC data in FIG. 1 show the peak of the melt and freeze transitions of the pure organoclay which occur at 39.6° C. and 34.4° C., respectively. In FIG. 2, the DSC cooling curves for the paraffin wax and the nanocomposite containing 10 weight percent organoclay are shown. The peak freeze transitions for the paraffin wax occur at 45.7° C. and 28.4° C. with ΔH values of −136.8 J/g and −26.6 J/g, respectively. The presence of two freeze temperatures indicates that the paraffin wax consists of a bimodal distribution of molecular weights. The cooling curve for the nanocomposite is almost identical to the pure paraffin wax, but differs in a significant way when the total thermal transition energy is considered. The freeze transition of the organoclay at 35° C. is no longer present in the nanocomposite because of the formation of a new nanocomposite phase. The peak freeze transitions of the nanocomposite occur at 45.2 and 28.1° C. with ΔH values of −127.0 J/g and −27.5 J/g, respectively. From a measurement of normalized peak areas (i.e., normalized for sample weight), the total heat of crystallization for the pure paraffin is −0.99 J while for the nanocomposite the value is −1.66 J. These data show that the degree of crystallization in the nanocomposite is higher than the paraffin reference. Thus, it may be concluded that the organoclay acts as a nucleating agent.

Example 2

In this example, the effect of using a paraffinic wax with increased melt/freeze temperature on nanocomposite performance is illustrated. The organoclay of Example 1 was dispersed in Paraflint H-I (a product of Moore & Munger). This is a high melting wax that is miscible with low density polyethylene (LDPE) at low wax/polymer ratios. The melt and freeze transitions of the wax are almost identical with that of LDPE. The nanocomposite was prepared with 10 weight percent organoclay loading and the oxygen permeability of the pure wax and the nanocomposite were measured. The permeability of the reference wax was $3404 \times 10^{-17}$ mol $O_2$/m·s·Pa, while that of the nanocomposite was $2393 \times 10^{-17}$ mol $O_2$/m·s·Pa. In this case the oxygen permeability was reduced only 30 percent relative to the pure wax. This is in contrast to the paraffin wax nanocomposite of Example 1 which demonstrated a 98.4 percent reduction in oxygen permeability at 10 weight percent organoclay loading. This example illustrates the point that as the freeze transitions of the organoclay and the wax are further separated from one another, the ability to form an effective nanocomposite phase is diminished.

Example 3

While maintaining the organoclay in an exfoliated state is important to nanocomposite performance, it may not be the only determining factor affecting barrier performance. Without wishing to be limited to any specific theory, it is believed that the inability of an isotropic polymer phase to wet and bond with an anisotropic organoclay surface is also a contributing factor responsible for the poor barrier performance observed in polyolefin systems, and in polymer systems in general. In other words, while it may be relatively easy for a paraffin molecule to suffer the loss in entropy necessary to adopt a favorable orientation to interact with the organoclay surface, it is unlikely that the significantly greater loss in entropy accompanying the uncoiling of a high-molecular-weight polymer could be compensated sufficiently by changes in enthalpy. This hypothesis is supported by the data in Table 2, which show the effects of freezing points and molecular weight on oxygen barrier. As the olefin chain length is increase from paraffin to LDPE, we see a steady decline in the influence of the organoclay on oxygen transmission rate. This can be partially explained by the fact that an increase in chain length is accompanied by an increase in peak recrystallization temperature, which would lead to phase separation of the clay during cooling of the melt.

However, while the peak recrystallization temperatures of Paraflint H-1 and LDPE are virtually identical, the wax nanocomposite still exhibits some improvement in barrier properties while the LDPE system shows no change in oxygen permeability.

TABLE 2

Relationship between oxygen barrier, molecular weight, and peak recrystallization temperature.

| System* | Olefin MW | Peak Freezing Temperature, °C. | % Reduction in $O_2$ Permeability |
|---|---|---|---|
| Paraffin | ~400 | 45.5 | 98.4 |
| Paraflint H-1 | 785 | 87 | 36.9 |
| LDPE | >40,000 | 86.6 | 0 |

*The nanocomposite systems all contain 5 weight percent organoclay as prepared in Example 1.

Example 4

To overcome the difficulties in exfoliating organoclays in hydrophobic polymers like the polyolefins, researchers have used functionalized polymers, like maleated polyethylene and polypropylene, as dispersants. While polar functional groups can interact with the organoclay surface and compatibilizing agents can promote exfolation, the presence of organoclay thermal transitions would still be present and, if not matched to the polymer, would create a highly permeable interphase surrounding the organoclay. While this approach to nanocomposite formation has been shown to provide modest improvements in the mechanical properties of polyolefins, there is no prior art that shows increased barrier toward oxygen or water vapor in polyolefins or waxes.

In Example 1, the poly(propylene glycol) was used to introduce disorder within the quaternary amine monolayer. In this example a cosurfactant is used to increase the interaction between the organoclay surface and LDPE by increasing the effective freeze temperature of the organoclay surface and to introduce a degree of isotropy to the organoclay surface. An organoclay was prepared in the same manner as in Example 1 except without the addition of poly(propylene glycol). Furthermore, the quaternary amine loading was reduced to 90 meq per 100 g of clay to accommodate the adsorption of the cosurfactant. The organoclay filter cake was mixed with polyethylene-block-poly(ethylene glycol) (Aldrich Chemical Co.) at a weight ratio of 70 percent organoclay to 30 percent cosurfactant, on a dry basis. The cosurfactant, which has an HLB value of 4, a 50-carbon alkyl chain, and a melting and freezing point that closely matches that of LDPE is miscible with LDPE at low loading levels.

Figure 3:
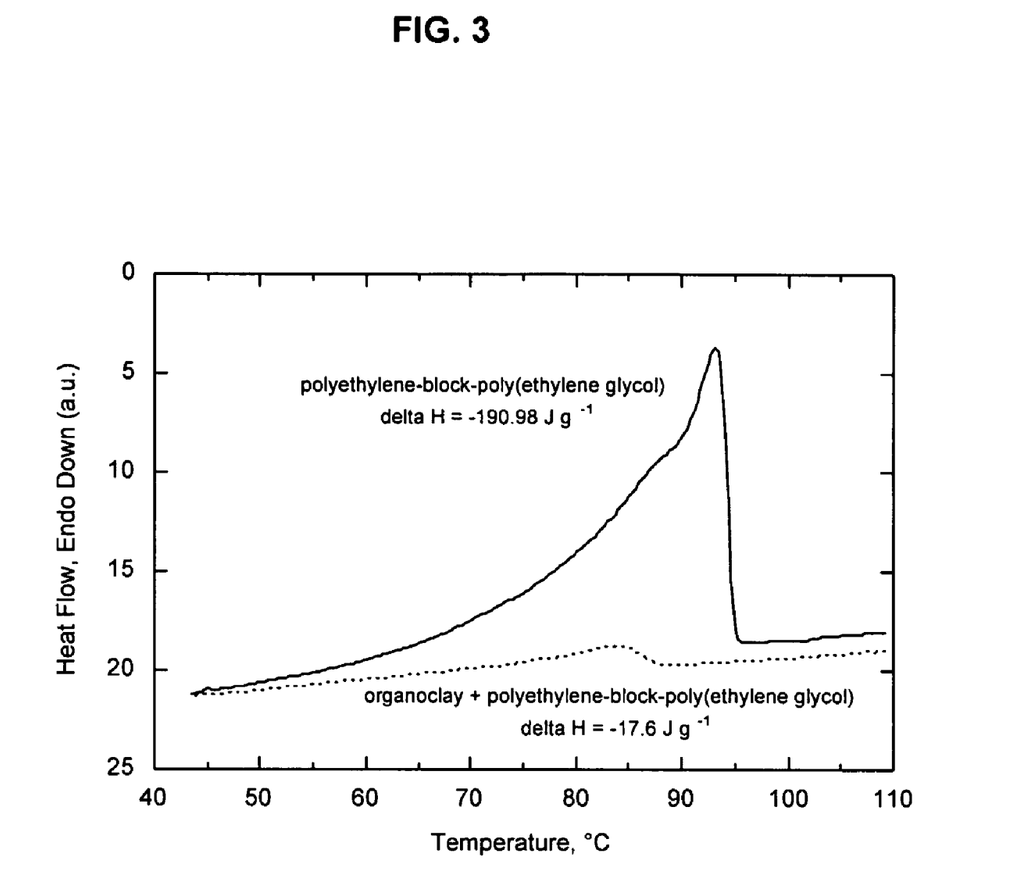
FIG. 3. Cooling curves for the polyethylene-block-poly (ethylene glycol) cosurfactant and the nanocomposite of Example 4 containing 70 weight percent organoclay. The presence of the organoclay reduced the peak recrystallization temperature of the block copolymer from 92.6° to 84° C.
Figure 4:
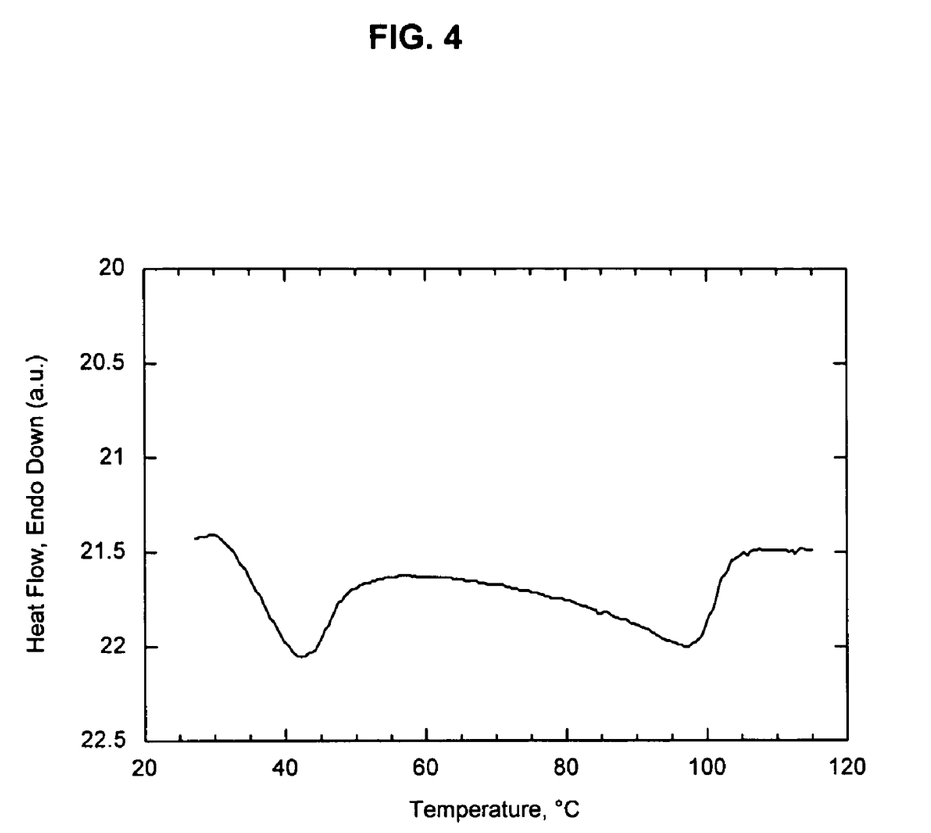
FIG. 4. DSC heating curve for the nanocomposite of Example 4 showing the presence of the melt transitions for the quaternary amine on the organoclay and the cosurfactant [polyethylene-block-poly(ethylene glycol)].

The DSC data in FIG. 3 are the cooling curves for the polyethylene-block-poly(ethylene glycol) and the clay nanocomposite containing 70 weight percent organoclay. The presence of the organoclay reduced the peak freeze temperature of the block copolymer from 92.6° C. to 84° C., indicating the presence of a nanocomposite phase having thermal transitions that are intermediate to those of the individual components. However, the thermal transitions present in the pure organoclay of Example 1 were still detectable in the nanocomposite. In FIG. 4 the melt transitions of the quaternary amine and the cosurfactant are detectible at 42.1° and 97.1° C., respectively. The broad melt/freeze transitions of the cosurfactant are also noteworthy and problematic. The broad thermal transitions mean that at least a portion of the organoclay surface will be in the melt state while the polymer is recrystallizing. This raises the possibility of forming interfacial defects between the organoclay and the polymer as the system cools to room temperature. The ideal surfactant for preparing an organoclay would display narrow melt/freeze transitions at temperatures near or slightly above the thermal transitions of the polymer.

The x-ray diffraction pattern of the nanocomposite showed a broad reflection from the basal surface without any discrete basal spacing (D. J. Chaiko in *Affordable Materials Technology—Platform to Global Value and Performance*, B. M. Pasmussen, L. A. Pilato, and H. S. Kliker, EDS., SAMPE: Covinal, Calif., 2002, 1064). The organoclay concentrate was diluted with LDPE to a final organoclay concentration of about 8 weight percent by compounding in a Brabender mixer for 30 min. at 130° C. at a temperature of 170° C. The nanocomposite was compression molded to produce transparent films of 125 microns thick. The oxygen permeability of the nanocomposite was measured and found to be 14 times lower than the LDPE reference. This represents an approximate 93 percent reduction in oxygen transmission relative to the pure LDPE film.

While the performance of the nanocomposite is very good, the relative reduction in oxygen permeability is less than what was observed in the paraffin system of Example 1. This is believed to be due to the fact that the melt/freeze transitions of the organoclay surface were still detectable (see FIG. 4). Increasing the peak recrystallization temperature of the organoclay by use of a higher freezing quaternary amine would be expected to improve the barrier properties even further.

This example highlights the fact that while coupling agents or compatibilizing agents (e.g., maleated polyolefins) may help disperse the organoclay and aid in the formation of nanoscale dispersions, the fact remains that the phase transitions of the quaternary amine are likely to still be present, and can be expected to lead to grain boundary defects that would provide an unimpeded path for gas transport, thereby limiting the barrier performance of the nanocomposite.

Example 5

Figure 5:
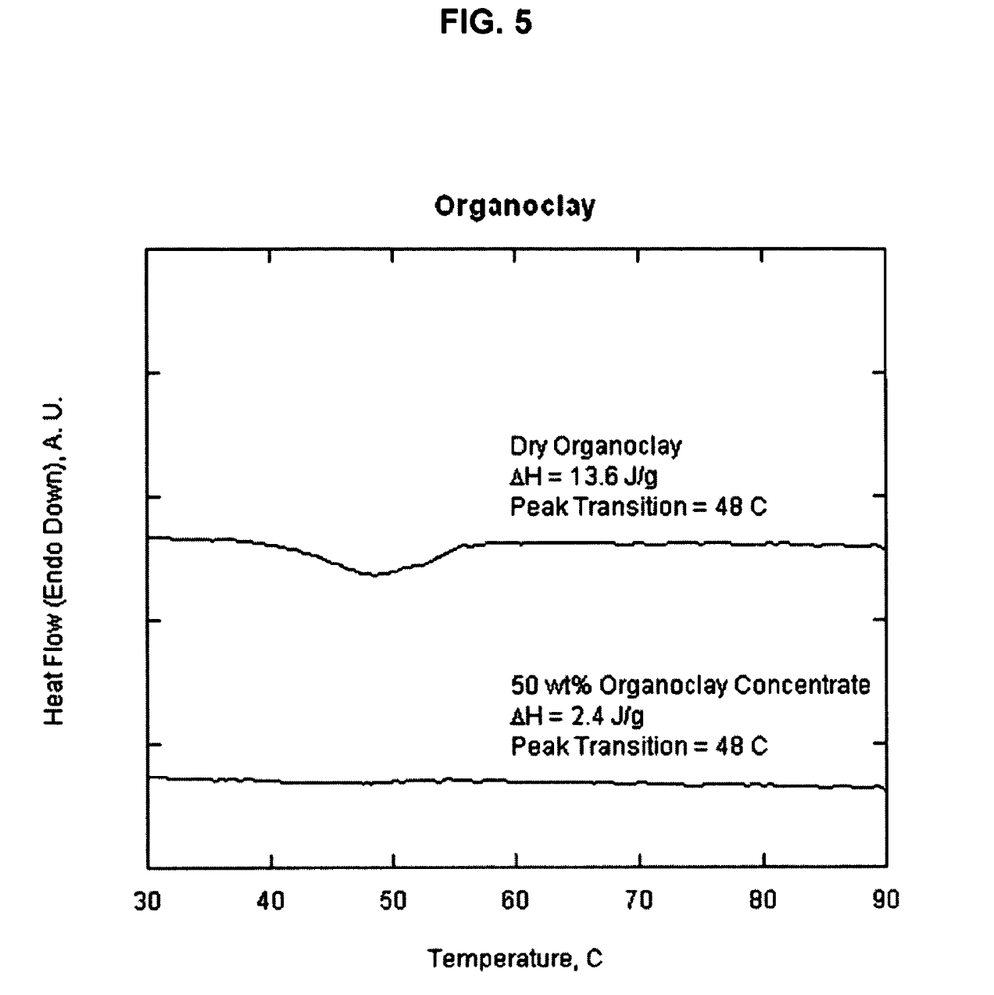
FIG. 5. DSC heating curve for the nanocomposite of Example 5 showing inhibition of the normal melt/freeze transitions of the organoclay surface by the polymer. The upper curve shows dry organoclay with $\Delta H=13.6$ J/g and a peak transition of 48° C. The lower curve is a 50 wt % organoclay concentrate with $\Delta H=2.4$ J/g and a peak transition of 48° C.

This example illustrates the compatibility between an organoclay and an amorphous polymer. In this case the crystal phase transitions of the surfactant monolayer at the clay surface are inhibited, rendering the clay surface miscible with the polymer. An organophilic clay was prepared from a commercially available, water-washed montmorillonite (Cloisite Na® which is a product of Southern Clay Products). The clay was dispersed in 40° C. tap water at a solids concentration of 2.5 weight percent by high-shear mixing for 40 minutes. The edge of the clay was modified by addition of an aqueous solution of the ammonium salt of 1-hydroxydodecane-1,1-diphosphonic acid. The amount of ammonium alkyldiphosphonate added was 3 weight percent relative to the weight of the dry clay. Following equilibration for 30 minutes, the temperature of the slurry was increased to 70° C. and an amount of dimethyl dihydrogenated tallow ammonium chloride (Arquad 2HT-75, a quaternary amine salt commercially available from Akzo Nobel) equivalent to 110 milliequivalents per 100 g clay was added over a period of one hour. Combined with the quaternary amine was an amount of poly(propylene glycol) equivalent to 4 weight percent relative to the dry weight of the clay. The molecular weight of the poly(propylene glycol) was 1000. Also combined with the quaternary amine solution was an antioxidant, Irganox® B225 (a product of Ciba Specialty Chemicals Corp.) at a concentration of 1000 ppm relative to the weight of the organoclay. Mixing of the clay suspension was continued for one hour after all of the quaternary amine salt was added. The suspension was vacuum filtered, redispersed in deionized water at 60° C. and refiltered. The organoclay filter cake was mixed with ethanol at a concentration of 30 wt % relative to the weight of the organoclay (dry basis) and polybutenes (a mixture of isomers containing >90% isobutylene, Average $M_n$ 750) at a concentration of 50 wt % relative to the weight of the organoclay (dry basis). The material was mixed at 90° C. to disperse the organoclay in the polybutenes. The water associated with the organoclay filter cake was flushed from the clay surface as a liquid water phase that was decanted. The last traces of water and alcohol were removed with continued stirring at 90° C. The product was a transparent green nanocomposite. Oxygen and carbon dioxide transmission were measured by preparing a laminate film wherein the nanocomposite was layered between two sheets of polystyrene. The gas transmission was measured at 30° C. The gas transmission of the polystyrene film was measured independently and used to calculate the effective permeability of the nanocomposite layer using the following equation:

$$1/P_t = \theta_1/P_1 + \theta_2/P_2$$

Where $P_t$ is the permeability of the laminate, $P_1$ and $P_2$ are the permeability of the polystyrene and nanocomposite films, respectively; $\theta_1$ and $\theta_2$ are the fractional thickness of the respective films. The gas transmission results are given in Table 3. In this example the organoclay is able to improve the gas barrier properties of the amorphous polymer film even though the organoclay by itself shows a melt/freeze transition which would be expected to render the organoclay incompatible. However, DSC measurements show that in this example, the polymer interacts with the organoclay in such a way as to inhibit the normal melt/freeze transitions of the organoclay surface. The DSC data are shown in FIG. 5 and indicate the presence of both crystal and amorphous phases within the surfactant monolayer.

TABLE 3

Permeability of organoclay/polybutene nanocomposite containing 50 wt % organoclay

| Gas | Permeability, mol/m · s · Pa ($10^{-17}$) | % Reduction Relative to LDPE |
|---|---|---|
| Oxygen | 2.2 | 98.2 |
| Carbon Dioxide | 0.51 | 99.8 |

Example 6

In this example an organoclay concentrate is prepared that is compatible with the amorphous phase of a polyolefin. The organoclay filter cake of Example 5 was combined with ethanol at a concentration of 30 wt % relative to the weight of the dry organoclay, polybutenes ($M_n$ of 750) at a concentration of 15 wt % relative to the weight of the dry organoclay. As in Example 5, the water was flushed from the filter cake as a liquid stream and decanted. The concentrate was then mixed at 90° C. with poly(ethylene-co-1-butene) having a melting point of 60° C. at a concentration of 30 wt % relative to the weight of the dry organoclay. The remainder of the water and alcohol were removed with continued stirring at 90° C. The product was a clear, green concentrate that can be diluted with polyethylene to produce a final nanocomposite. Diluting 10:1 produced a clear transparent nanocomposite with no trace of undispersed clay. In this example, the low molecular weight alcohol combined with the amorphous polybutenes act in conjunction as polar and nonpolar activators, enabling the dispersion of the organoclay in the high molecular weight poly(ethylene-co-1-butene). The poly(ethylene-co-1-butene), in turn acts as a compatibilizer rendering the organoclay miscible with the amorphous polyethylene phase.

Example 7

The use of polar activators to aid the dispersion of organoclays into various organic systems has been discussed in the scientific and patent literature. The most effective activators have been found to be low-molecular-weight alcohols and ketones (e.g., methanol, ethanol, acetone). However, there is no discussion in either the scientific or patent literature about the use of combinations comprised of polar and nonpolar activators. This example offers an additional illustration of the use of combined polar/nonpolar activator systems to effect the dispersion of an organoclay into a high-molecular-weight polymer. The organoclay filter cake of Example 5 was combined with ethanol and polybutenes ($M_n$ 750) to produce an activated organoclay. The mixture was combined with polybutadiene and heated to remove last traces of water and ethanol. The product was a crystal clear yellow nanocomposite. Polar and nonpolar activators are used to enable dispersion of an organoclay in an amorphous polymer. It was also observed that clear transparent nanocomposites could be produced by dispersing the activated organoclay of this example into polystyrene, polymethylmethacrylate, poly(ethylene-co-vinyl acetate), poly(ethylene-co-octene) (Engage® 8402, a product of DuPont), atactic polypropylene, poly(ethylene glycol) diacrylate, and monomers such as ethyl hexyl diacrylate.

Example 8

This example further illustrates the use of combined polar/nonpolar activators to aid the dispersion of high melting organoclays into amorphous polymers. An organophilic clay was prepared from a commercially available, water-washed montmorillonite (Cloisite Na® which is a product of Southern Clay Products). The clay was dispersed in 40° C. tap water at a solids concentration of 2.5 weight percent by high-shear mixing for 40 minutes. The temperature of the slurry was increased to 70° C. and an amount of cetyl trimethyl ammonium bromide (CTAB) equivalent to 90 milliequivalents per 100 g clay was added over a period of one hour. Combined with the quaternary amine was an amount of poly(ethylene glycol) equivalent to 4 weight percent relative to the dry weight of the clay. The molecular weight of the poly(ethylene glycol) was 1500. The organoclay was dried and crusher to produce a fine powder. The dispersion of the organoclay into polybutenes (Mn 750) was aided by the addition of both ethanol and toluene (50:50) to a concentration of about 30 wt % relative to the weight of the organoclay. The use of combined polar/nonpolar activators enabled the organoclay to disperse in the polybutenes. Continued mixing at approximately 130° C. resulted in the evaporation of the ethanol and toluene leading to a highly viscous, transparent nanocomposite. In this example the crystalline surfactant coating of the activated organoclay was rendered amorphous by combination with an amorphous polymer.

Example 9

In this example a high melting organoclay is dispersed into a semicrystalline polymer with the aid of combined polar/nonpolar activators. The CTAB organoclay of Example 8 was activated by combining with 30 wt % ethanol relative to the weight of the dry organoclay and dispersed in xylene. The weight ratio of organoclay to xylene was 0.04. The combination of ethanol and xylene led to a transparent organoclay dispersion. A polypropylene oligomer, created by vis-breaking polypropylene with Trigonox® 101 (a product of Akzo Nobel) was added to the organoclay slurry and heated to 110° C. to produce a clear organoclay dispersion. The mixture was poured into an open glass dish to allow the xylene and alcohol to evaporate. During evaporation of the solvent the nanocomposite became violet due to small angle scattering of visible light as the polymer crystallized. The final composition of the concentrate was 30 wt % CTAB treated organoclay, 70 wt % vis-broken polypropylene. The concentrate was further diluted by combining one g of the concentrate with 30 g of polypropylene by mixing for 5 min at approximately 180° C. in a Brabender mixer at 50 rpm. Compression molded films of the nanocomposite were crystal clear with a noticeably higher bending modulus.

Example 10

Comparative Example

In the previous examples, the quaternary amine used to prepare the organoclay exhibited a melting point below 40° C. In the present comparative example, an organoclay is prepared using cetyltrimethyl ammonium bromide, which has a decomposition temperature in excess of 230° C.

The organoclay was prepared by dispersing Cloisite Na® in deionized water at 40° C. The clay was dispersed with high shear mixing at a solids concentration of 2 weight percent. The edge of the clay was treated with the ammonium salt of 1-hydroxydodecane-1,1-diphosphonic acid. The amount of ammonium alkyldiphosphonate added was 0.5 weight percent relative to the weight of the dry clay. Following equilibration for 30 minutes, the temperature of the slurry was raised to 70° C. and an amount of cetyltrimethyl ammonium bromide (Aldrich) was added equivalent to 100 meq per 100 g clay over a period of one half hour. Combined with the quaternary amine was an amount of poly(ethylene glycol) equivalent to 4 weight percent relative to the weight of the dry clay. The molecular weight of the poly(ethylene glycol) was 1500. Mixing of the clay suspension was continued for one hour after all of the quaternary amine salt was added. The suspension was filtered, redispersed in deionized water at 70° C. and refiltered. The organoclay was dried crushed and examined by DSC. The organoclay did not show a melt transition. Furthermore, the organoclay failed to disperse in LDPE by melt compounding. This example illustrates the importance of preparing organoclays with surfactants that exhibit melt/freeze transitions near those of the polymer if dispersion and exfoliation are to be achieved.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above.

All references cited herein are specifically incorporated by reference in their entirety into the disclosure of this application.

While preferred embodiments have been illustrated and described, it should be understood that changes and modifications can be made therein in accordance with ordinary skill in the art without departing from the invention in its broader aspects as defined in the following claims.

What is claimed:

1. A method of preparing a nanocomposite comprising combining an organophilic clay and a polymer to form a nanocomposite, wherein the organophilic clay and the polymer each have a peak recrystallization temperature, and wherein the organophilic clay peak recrystallization temperature sufficiently matches the polymer peak recrystallization temperature such that the nanocomposite formed has less permeability to a gas than the polymer.

2. The method according to claim 1, wherein the gas is oxygen, nitrogen, carbon dioxide, hydrogen, or water vapor.

3. The method according to claim 2, wherein the nanocomposite formed has at least two fold less permeability than the polymer to oxygen, carbon dioxide or both.

4. The method according to claim 1, wherein the organophilic clay is a phyllosilicate.

5. The method according to claim 1, wherein the organophilic clay is a smectite or mica.

6. The method according to claim 1, wherein the organophilic clay is a smectite selected from the group consisting of montmorillonite, hectorite, saponite, sauconite, beidellite, nontronite, Laponite, and combinations of two or more thereof.

7. The method according to claim 1, wherein the organophilic clay is a surface-treated clay.

8. The method according to claim 7, wherein the surface-treated clay includes an edge-modifying surfactant adsorbed onto an edge thereof.

9. The method according to claim 7, wherein the surface-treated clay includes a nonionic polymeric hydrotrope adsorbed onto the basal surface thereof.

10. The method according to claim 1, wherein the organophilic clay peak recrystallization temperature is within ±100% of the polymer peak recrystallization temperature.

11. The method according to claim 1, wherein the organophilic clay peak recrystallization temperature is within ±50% of the polymer peak recrystallization temperature.

12. The method according to claim 1, wherein the organophilic clay peak recrystallization temperature is within ±25% of the polymer peak recrystallization temperature.

13. The method according to claim 1, wherein the organophilic clay peak recrystallization temperature is within ±10% of the polymer peak recrystallization temperature.

14. The method according to claim 1 further comprising preparing the organophilic clay by treatment of a clay with at least one surfactant to yield an organophilic clay having a peak recrystallization temperature higher than the polymer peak recrystallization temperature.

15. The method according to claim 14, wherein the organophilic clay may function as a nucleating agent during formation of the nanocomposite.

16. The method according to claim 14, whereby the growth of polymer spherulites is lessened.

17. The method according to claim 14, whereby the growth of polymer spherulites is prevented.

18. The method of claim 1 wherein the polymer is a wax.

19. The method of claim 18 wherein the wax is paraffin, microcrystalline montan, vegetable waxes, and mixtures thereof.

20. The method of claim 18 wherein the wax is a Fisher-Tropsch wax, polyethylene, polypropylene, polymethylene, chemically modified waxes, polymerized poly alpha olefins, or mixtures thereof.

21. The method of claim 1 wherein the polymer is polyethylene, poly alpha olefins and copolymers of polyethylene and alpha olefins, polypropylene, or copolymers of polyethylene and polypropylene.

22. The method of claim 1 further comprising combining a mixture of polar and nonpolar activators with the organophilic clay to disperse the organophilic clay in the polymer.

23. The method of claim 22 wherein the non-polar activator is a xylene, toluene, polybutene, polystyrene, polybutene block copolymer, polyacrylate, polymethacrylate or wax.

24. The method of claim 22 wherein the organophilic clay is a surface-treated clay comprising a quaternary ammonium salt and the non-polar activator is polybutene-block-polystyrene.

25. A method of preparing a nanocomposite comprising
  determining whether the peak recrystallization temperature of an organophilic clay sufficiently matches the peak recrystallization temperature of a polymer to form a nanocomposite phase having less permeability to a gas than the polymer, and
  combining the matched organophilic clay and the polymer to form the nanocomposite having less permeability to a gas than the polymer.

26. A method of preparing a nanocomposite comprising combining an amorphous organophilic clay and an amorphous polymer to form a nanocomposite, wherein the clay and the polymer each have a glass transition temperature, and wherein the clay glass transition temperature sufficiently matches the polymer glass transition temperature such that the nanocomposite formed has less permeability to a gas than the polymer.

* * * * *